Sept. 29, 1970     J. U. GELLERT     3,530,539

GATE VALVE FOR INJECTION MOLDING MACHINES

Filed Feb. 2, 1968

INVENTOR
JOBST ULRICH GELLERT

BY George H. Rickes

ATTORNEY

United States Patent Office 3,530,539
Patented Sept. 29, 1970

3,530,539
GATE VALVE FOR INJECTION MOLDING MACHINES
Jobst Ulrich Gellert, 227 Viewmount Ave.,
Toronto, Ontario, Canada
Filed Feb. 2, 1968, Ser. No. 702,599
Int. Cl. B29f 1/05
U.S. Cl. 18—30                                     5 Claims

ABSTRACT OF THE DISCLOSURE

An injection molding machine having a valve gated mold which provides the runner system thereof with a volume expansion device that will automatically expand to receive the hot melt which is displaced in the runner system by the valve pins when they are moved in to closed position by the opening of the mold within a molding cycle. The volume expansion takes place automatically within each molding cycle simultaneously with valve pins re-seating to close the terminal of the runner system which feeds hot melt into the mold cavity. When the valve pins are unseated by the closing of the molds the volume expansion device automatically returns to and is locked in its normal position; that is, the position in which it is held during the injection time of the molding cycle.

BACKGROUND OF THE INVENTION

Figure 1:
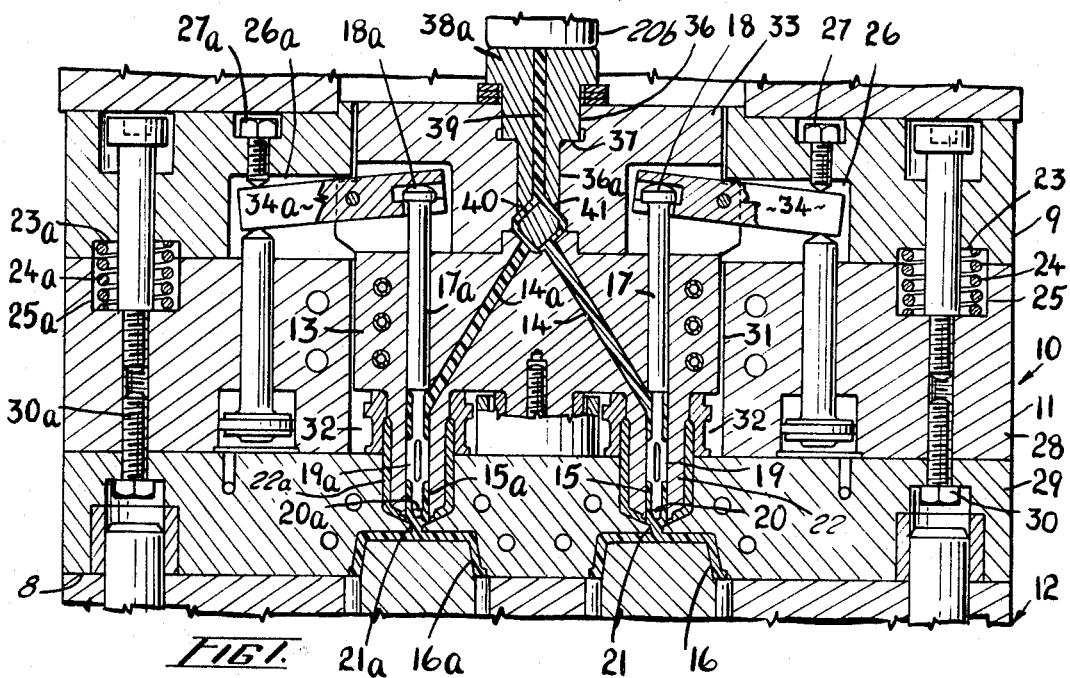

This invention is related to my co-pending U.S. application No. 624,097 filed Mar. 17, 1967 entitled "Valve Gated Mold Construction," and now matured to Pat. No. 3,488,810. It will, of course, be understood that the present invention is not restricted to the valve gated mold construction illustrated in the said application but can be adapted by a skilled person in injection molds generally without departing from substance of this invention. Reference is made to the said pending application to explain and illustrate the construction and operation of the present invention.

A problem with the valve gating technique of the prior injection molds and also of the aforesaid application is that "leak or drool" of hot melt occurs when the valve gate, which controls the entrance into the mold cavity, closes. The structure illustrated in the said pending application has a molding cycle wherein the actual mold closed time of the valve-gating cycle therein described is divided into two stages. The first stage is where the clamp-force locks the mold to withstand the injection pressure, and a second stage which is triggered simultaneously with, or after, retraction of the injection ram. With the beginning of the second stage, the machine releases its pressure-lock on the mold and the clamp-platen (movable platen) of the machine moves a predetermined distance permitting the mold assembly to separate behind the parting line of the mold thus creating the space required to permit the closing of the valve-gate. The cavity forming portions of the mold remain in this second stage position until the molded article has cooled down enough for ejection. Only then does the clamp-platen complete its opening stroke.

In any valve gating mold the valve pins will displace volume in the runner system while they are moved into closed position. If the displaced volume is not adequately taken care of with means for volume expansion any valve gated mold will have excessive leakage or drool. Our method of valve gating, using the interrupted opening stroke, leads itself ideally to remedy this problem.

The present invention solves the problem of leak and "drool" by providing the hot runner system with the means for volume expansion and the part line of the mold and the stationary platen, with a chamber in the hot runner system which automatically expands its normal capacity when the mold opens and thus provides sufficient space to accommodate the hot melt displaced by the closing valve gate and automatically resumes its normal capacity during the injection cycle of the molding machine.

The invention comprises, in combination, with a mold having a hot runner provided at one end with an inlet communicating with an injection chamber of an injection molding machine and at the other end with an outlet communicating with the mold cavity and a valve-gate operable to open and close said outlet and an expansion chamber defined by a piston-like valve mounted in said hot runner between the valve-gate and the inlet and biasing means urging the piston-like valve to a retracted position when said mold opens to form said expansion chamber and automatically cut-off flow of melt between the injection chamber and the hot runner, the retraction automatically creating a space large enough to accommodate the melt displaced by the closing valve-gate, said piston-like member being returned to and held in its normal position by the reaction between said clamp platen and the stationary platen when in closed position.

It will be apparent to those skilled in the art to which this invention relates that the invention can be employed with the injection molding machines marketed at the present time. It will be obvious to those skilled in the art to which this invention relates, that the prior art structures will require machine-modifications in order to adapt the present invention to mold assemblies in current machinery.

Figure 2:
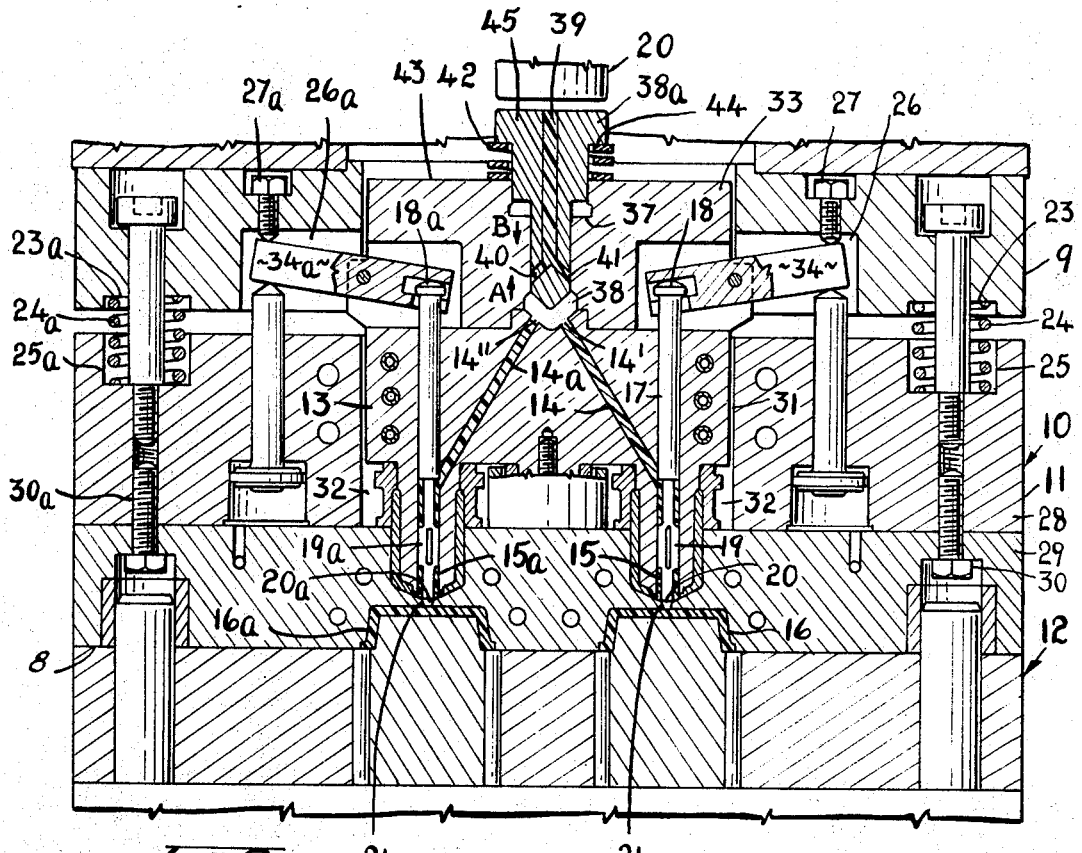

The present invention will be more fully understood by reference to the following description in conjunction with the appended drawings wherein:

FIG. 1 is a partial cross-sectional view of a mold assembly according to the present invention with the mold parts locked together in the injection cycle (first stage); and FIG. 2 is substantially the same as FIG. 1 but with the machine in its second stage of the molding cycle.

The apparatus disclosed herein does not require to be described in detail as its construction and operation is fully disclosed in said pending application except as to such parts that relate to the present invention. For fuller details than is given herein, reference is to be had to the mentioned application. It will therefore be sufficient to give only such details as may be necessary to explain the construction and operation of the present invention and its adaptation to an injection molding machine such as is described in the said pending application.

The mold assembly illustrated in the drawings and generally indicated by the number 10 is of the two cavity types and comprises an annular collar section 9, a hot-side mold-half 11 which is mounted on the stationary platen (not shown) of the machine and a complementary mold half 12 which is mounted on the movable (clamp) platen. The parting line between the mold halves is indicated by the number 8. The mold-half 10 includes a hot runner 13 which has the usual feed channel 14, 14a which communicate at one end with injection nozzle 20b for the injection of hot melt of the hot runner as required and as programmed, and at their opposite ends designate, outlet ends 15, 15a communicate with mold cavities 16, 16a, all of which will be more particularly described.

Feed channel 14, 14a adjacent each outlet ends 15, 15a are provided with the usual valve-gate pins 17, 17a having headed portions 18, 18a respectively for a purpose to be later described.

Each valve-gate pin 17, 17a includes a desired torpedo section 19, 19a respectively with the lower ends of each pin tapered to form a frusto-conical valve 20, 20a respectively adapted to seat in its respective valve seat 21, 21a formed in the entrance to the mold cavities 16, 16a respectively.

Each valve-gate pin 17, 17a is slidably mounted for reciprocating motion within the hot runner 13, as is now well known to open and close the respective valve seat 21, 21a in each nozzle 22, 22a which is detachably connected to the hot runner or integrally formed therewith. Each valve 20, 20a thus controls the flow of hot melt to its respective mold cavity 16, 16a.

The collar 9 is bored as at 23, 23a to provide seats for spring elements 24, 24a, the other end of which seats in bores 25, 25a formed in mold-half 11. With the collar and mold-half 11 in abutment, spring elements 24, 24a are placed under compression such that the mold-half 11 is constantly under a biasing force urging it away from the collar 9. The collar 9, by turning, milling, casting or by any other standard manufacturing process, is provided with inner recesses 26, 26a which, in conjunction with the proximate face of mold-half 9 forms a cavity for the means for actuaing the gate pins 17, 17a.

Extending into each recess 26, 26a, is the end of adjustable members 27, 27a the heads of which are countersunk into the collar as shown.

As shown, the mold-half 11 comprises a section 28 and a cooled cavity section 29 rigidly but detachably interconnected by recessed retaining studs 30, 30a. Section 28 is centrally recessed to permit insertion of the hot runner 13, the central recess being of such a dimension as to permit the formation of an annular, insulating air space 31 between the hot runner and the section 28. At spaced intervals, apertures 32 are formed in section 28 so as to permit introduction of the nozzles of the hot runner 13 to the cooled cavity plate 29.

The collar 9, as shown, is formed with a hollow centre to receive a centre piece 33 which is mounted on and forms part of the hot runner 13, the inner portion being undercut to complete and be accommodated partly in recesses 26, 26a.

As shown and particularly described in the said pending application, there is privotally mounted in each of the recesses 26, 26a rocker arms 34, 34a. One end of each of the rocker arms 34, 34a enclosed in recesses 26, 26a engages its respective headed portion 18, 18a of valve-gate pins 17, 17a in a pivotable and sliding relationship. In brief, rocking motion of rocker arms 34, 34a, either in one direction or the other, will effect movement of the valve-gate pins, the headed ends having a combined sliding and pivoting motion relative to its respective rocker arm.

The subject matter of the present invention will now be described, which invention is incorporated in the centre piece 33 and forms part of the hot runner 13 and feed channel 14, 14a.

The centre piece 33 is formed with a cylindrical bore 36 having a substantially wide diameter facing the stationary platen and of substantial depth and a restricted diameter from there inwardly to the adjacent face of the hot runner 13. A shoulder 37 is formed by the constricted portion 36a of the bore 36. The inlet ends, indicated by the numbers 14' and 14'', of the feed channels 14, 14a communicate with the inner end of the constricted portion 36a which is slightly enlarged in diameter in that region to form an expansion chamber 38. A reciprocatable slide valve 38a having a shape corresponding to the shape of the bore 36 is mounted in the said bore. The slide valve 38a is of sufficient length to extend into the expansion chamber 38 a substantial distance and has a central passage 39 therethrough terminating in branch feed lines 40, 41 exiting through the sides of the valve adjacent the inner end, as shown. The outer end of the passage communicates with the nozzle 20b of the injection cylinder (not shown). When the slide valve 38a is in the retracted position (FIG. 2) the passages 40, 41 are closed by the wall of portion 36a and the expansion chamber 38 is formed. When the slide valve 38a is in the position shown in FIG. 1, the passages 40, 41 are brought into the expansion chamber 38 forming a through passage so that hot melt can flow through the runner to the mold cavity.

The slide valve 38a is biased in the direction indicated by arrow A by spring 42 which is mounted around the valve 38a between the outer face 43 of the centre piece 33 and the shoulder 44 of the enlarged head 45 of the slide valve.

The slide valve is moved in the opposite direction as indicated by arrow B by the movement of the stationary platen when the clamp-force locks the mold parts to withstand the injection pressure.

The operation of the device will now be explained. That action of closing the mold will move the slide valve 38a in the direction of the arrow B which will bring the exit ends of the feed branches 40, 41 into the expansion chamber 38 making a through passage to the runner 14, 14a. Hot melt can then flow through to the cavity.

At the beginning of the second stage, the clamp force is released which allows the springs 24, 24a to react to allow the section 28 and shoulder 9 to separate which action closes gate pins 17, 17a and at the same time, spring 42 is released to move the slide valve 38a in the direction of the arrow A. The movement of the slide valve in the direction of arrow A expands the capacity of the chamber 38 into which hot melt, displaced by the closing of the gate valves, will flow.

As soon as the mold cavity has been filled under pressure, the mold closing force is removed (second stage) and the springs 24 force the still closed mold-halves 11 and 12 away from collar 9 and at the same time the slide valve 38a is retracted by the spring 42 in the direction of arrow A. This retraction does two things. First the branches 40, 41, as shown in FIG. 2, are blocked off by the walls of the portion 36a and second, the retraction creates a space into which melt, displaced by the closing of the valve gates 17, 17a can flow.

It will also be readily perceived by those skilled in this art that this invention is susceptible to modification and change within the scope of the teachings of the foregoing disclosure.

What I claim is:

1. In an injection molding machine having a movable platen having a mold opening and closing stroke, a substantially stationary platen, a mold having a mold cavity, said mold being divided into a movable section and a substantially stationary section, the stationary section being mounted on the stationary platen and the movable section being mounted on the movable platen and moving therewith, and an injection chamber, said platens having a dwell position on the opening stroke in which the molds remain closed; the invention herein defined comprising a hot runner in said stationary mold and having at one end an inlet communicating with the injection chamber and at the other end an outlet communicating with the mold cavity, a valve-gate operable to open and close said outlet and a sliding valve member mounted in said hot runner between the valve gate and the inlet, said valve means being movable to an open position by closing said platens and mold sections under clamping pressure and retract to a closed position when said clamping pressure is released at the dwell position, and biasing means urging said member to the retracted position when the clamping pressure is released to move said sliding valve member to the closed position to thereby cut off communication between the injection chamber and the hot runner, the retraction of the slide valve automatically creating a space, in the hot runner which is large enough to accommodate the melt displaced by the closing of the valve gate.

2. In an injection mold according to claim 1 in which the said sliding valve member includes a channel therethrough forming the inlet of said hot runner.

3. In an injection mold according to claim 1 wherein said valve member comprises a piston having a central passage therethrough forming the inlet of said hot runner, an extension on said piston engageable with and actuated to a runner open position simultaneously with the valve gate opening by the substantially stationary platen when the platens close; a spring urging said piston to a retracted position when said platens open, said piston being actuated in the opposite direction simultaneously with the closing of the valve gate whereby when the piston is actuated to the retracted position a space is automatically created in the hot runner for melt displaced by the closing valve gate.

4. In an injection mold according to claim 1 wherein the runner is formed with enlarged portion coaxial with the longitudinal axis through the mold, a piston like valve member housed in the passage through said member forming the inlet of said hot runner enlarged portion, an extension on said member engaging with an opposing facing of the substantially stationary platen, and said member being actuated to a runner open position by the closing of the mold, a spring member urging said valve member to a retracted position to close said passage when said platens commence to open and said valve gate closes thereby automatically creating a space large enough to accommodate the melt displaced on closing the valve gate.

5. In an injection mold according to claim 4 in which the inner of the passage terminated in diagonal branch lines exiting the periphery of said valve member, said branch lines being covered by the inner wall of the enlarged portion when said member is in its retracted position.

References Cited

UNITED STATES PATENTS

| | | | |
|---|---|---|---|
| 2,217,661 | 10/1940 | Anderson | 18—30 X |
| 2,456,778 | 12/1948 | Gilchrist | 18—42 |
| 2,770,011 | 11/1956 | Kelly | 18—42 X |
| 2,878,515 | 3/1959 | Strauss | 18—30 |
| 3,301,928 | 1/1967 | Plymale | 18—42 X |
| 3,400,429 | 9/1968 | Ludwig | 18—30 |

J. SPENCER OVERHOLSER, Primary Examiner

M. O. SUTTON, Assistant Examiner

U.S. Cl. X.R.

164—304